United States Patent [19]

Paez et al.

[11] 4,304,350
[45] Dec. 8, 1981

[54] METHOD OF PRESSURIZATION SYSTEM FOR SUPERPLASTIC FORMING AND DIFFUSION BONDING

[75] Inventors: Carlos A. Paez, Huntington; Salvatore Stracquadaini, West Islip; Lino L. Olivier, Bethpage, all of N.Y.

[73] Assignee: Grumman Aerospace Corporation, Bethpage, N.Y.

[21] Appl. No.: 110,191

[22] Filed: Jan. 7, 1980

[51] Int. Cl.³ .................... B23K 31/02; B23K 37/04
[52] U.S. Cl. .................. 228/118; 228/44.1 R; 228/157; 228/173 C
[58] Field of Search .......... 228/44.1 R, 157, 173 A, 228/173 C, 118; 72/60, 364

[56] References Cited

U.S. PATENT DOCUMENTS

| 1,709,865 | 4/1929 | Muffly | 29/157.3 DX |
| 1,712,085 | 5/1929 | Litle, Jr. | 29/157.3 VX |
| 2,882,588 | 4/1959 | Rieppel et al. | 228/173 AX |
| 2,987,810 | 6/1961 | Campbell | 72/61 X |
| 3,018,543 | 1/1962 | Beck | 228/173 C |
| 3,024,525 | 3/1962 | Wisberger | 228/157 |
| 3,045,618 | 7/1962 | Adams | 72/61 X |
| 3,340,101 | 9/1967 | Fields, Jr. et al. | 72/60 X |
| 3,346,936 | 10/1967 | Miller et al. | 228/157 |
| 3,683,487 | 8/1972 | Sherman | 228/157 X |
| 3,764,174 | 10/1973 | Taninecz | 72/705 X |
| 3,895,436 | 7/1975 | Summers et al. | 228/157 |
| 3,896,648 | 7/1975 | Schertenleib | 72/61 |
| 3,920,175 | 11/1975 | Hamilton et al. | 228/173 A |
| 3,927,817 | 12/1975 | Hamilton et al. | 228/157 |
| 3,934,441 | 1/1976 | Hamilton et al. | 72/60 |
| 4,087,037 | 5/1978 | Schier et al. | 228/44.1 RX |
| 4,197,977 | 4/1980 | Deminet | 228/157 X |
| 4,220,276 | 9/1980 | Weisert et al. | 228/157 X |

Primary Examiner—Robert D. Baldwin
Assistant Examiner—J. Reed Batten, Jr.
Attorney, Agent, or Firm—Morgan, Finnegan, Pine, Foley & Lee

[57] ABSTRACT

A system for superplastic forming and diffusion bonding of a metal workpiece sandwich between an upper and lower die to form a structural shape wherein a hollow stainless steel pin is in sealed relationship with a hole in the surface of one metal layer and communicates with the interior of the sandwich. The hollow pin extends into a recess in one of the dies and is in sealing relationship with the recess.

13 Claims, 1 Drawing Figure

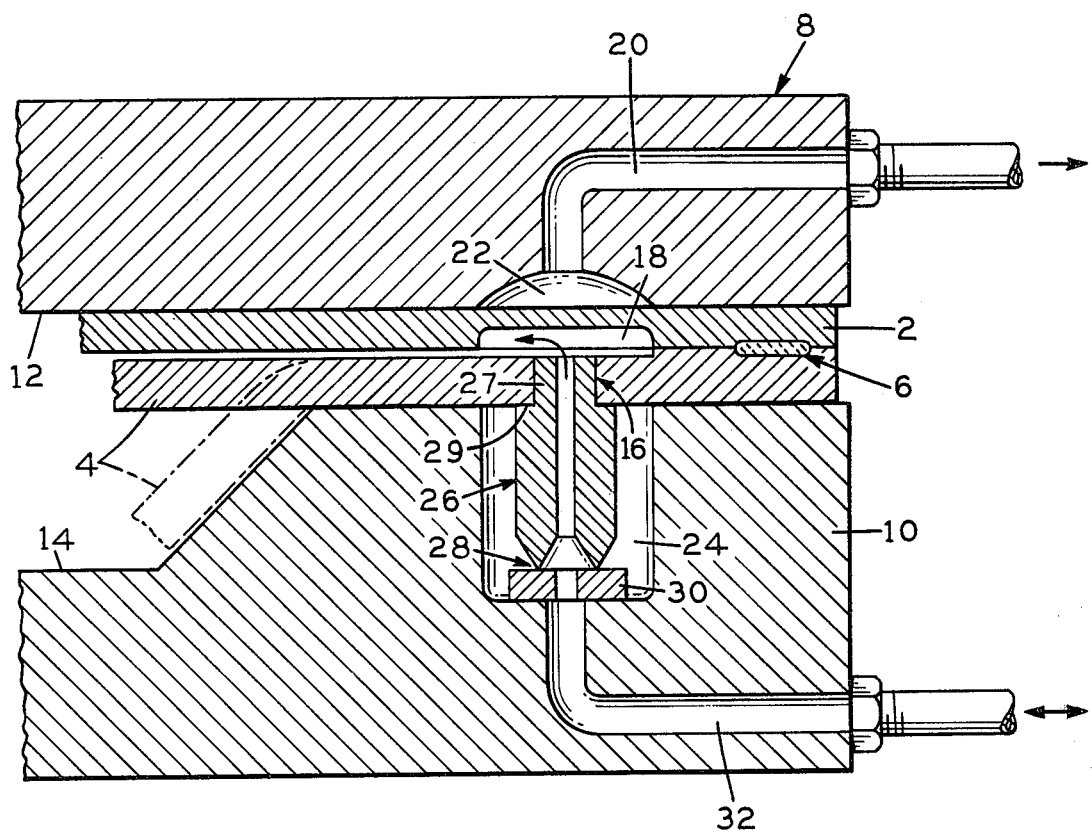

METHOD OF PRESSURIZATION SYSTEM FOR SUPERPLASTIC FORMING AND DIFFUSION BONDING

BACKGROUND OF THE INVENTION

This invention relates to superplastic forming and diffusion bonding and more particularly to a pressurized system for superplastic forming and diffusion bonding a sandwich-like construction made of a plurality of layers of metal such as titanium.

The process of superplastic forming and diffusion bonding is well known in the art. The process has the advantages of forming complex shapes and permitting deep drawing of metallic parts. At the temperatures involved the deformation stresses are relatively low, which permits the forming of complex parts under pressures which keep tool deformation and wear at a minimum.

Diffusion bonding which is used in conjunction with superplastic forming refers to the metallurgical bonding or joining of metal by the steps of applying heat and pressure for periods of time sufficient to cause co-mingling of the metal atoms at the places where the surfaces are joined.

The superplastic forming and diffusion bonding process is particularly useful in the aerospace industry in the formation of wings, frames and the like. The process is particularly useful in forming strengthening members used in aerospace structures referred to as frames and stringers.

Generally speaking, the process begins with cleaning the metal sheets to be used in the sandwich. The sheets are then selectively coated with a material commonly referred to as "stop-off" which typically is boron-nitride, yttria or some rare earth or other very inert material. The purpose of the "stop-off" is to prevent diffusion bonding of the sandwich-like material where the stop-off material has been applied. The areas coated with "stop-off" can be formed into a desired shape by the application of gas pressure applied to the inside of the metallic sandwich. Prior art systems have not been reliable for commercial production. In some prior art practices, an inlet tube was inserted between the sandwich layers to be used to evacuate the space between the sandwich layers and to thereafter supply gas under pressure to the spaces between the sandwich to form the sandwich into the desired honeycomb shape by superplastic forming.

In prior practices, after inserting the tube between the sandwich layers, the sandwich construction sometimes was welded around its periphery to form a unitary structure or was bonded during the superplastic forming, diffusion bonding cycle to form an assembly sometimes called a bag. Typically, this was accomplished by seam welding or under heat and pressure by diffusion bonding. In many operations there were more than one such inlet tubes.

One problem that has arisen as a result of these prior art practices where the inlet tube extended into the sandwich was that while welding the peripheries of the sandwiched sheets one or more of the inlet tubes would be pinched closed and rendered inoperable. Where this occurred, the subsequent operations were severely adversely affected, sometimes resulting in complete failure to form the desired assembly.

In another approach a tube was welded to the bag. The weld is susceptible to cracks that could break the seal which should exist between the inlet tube and the sandwich construction which also would adversely affect the superplastic forming operation.

There is a need, therefore, for a system for superplastically forming and diffusion bonding which is reliable, simple, inexpensive and yet adapted for high production use.

OBJECTS OF THE INVENTION

With the foregoing in mind it is an object of the invention to provide a new and improved system for superplastic forming and diffusion bonding.

Another object of this invention is to provide a new and improved system for superplastic forming and diffusion bonding to form a honeycomb shaped structure reliably and efficiently.

A still further object of this invention is to provide a new and improved system of superplastic forming and diffusion bonding wherein the inlet tube is perpendicular to the sandwich construction and maintained in sealing relationship with the interior of the sandwich construction.

A further object of this invention is to provide a new and improved system for superplastic forming and diffusion bonding wherein the inlet tube is positioned and arranged so that neither the inlet tube or its seal is affected by the welding or sealing of the edges of the sandwich.

Additional objects and advantages of the invention will be set forth in the description which follows and in part will be obvious from the description; the objects and advantages being realized and obtained by means of the instrumentation, parts, apparatus, steps and procedures particularly pointed out in the appended claims.

BRIEF DESCRIPTION OF THE INVENTION

Briefly described, the invention relates to a system for forming a honeycomb-like and stringer-stiffened structure by superplastic forming and diffusion bonding of metal sheets which are layered in the form of a sandwich and joined at the periphery by seam welding to form an assembly. The invention includes upper and lower die members which receive the sandwich assembly. The die members include passageways adapted to direct gases to and from the sandwich assembly. One of the die members has a recess in which is positioned a hollow metal pin preferably made of stainless steel. One end of the hollow pin is in sealing relationship within an opening in the bottom layer or sheet of the sandwich. The other end of the hollow pin has a knife-like edge and is in sealing relationship with a washer-like member within the recess. A feature of the invention is that the stainless steel tube is directed to the sandwich in a direction perpendicular to the sandwich rather than parallel to the sandwich.

In operation, the hollow pin is press fitted in the hole in the bottom sheet of the sandwich. The sheets are then cleaned and stop-off, preferably boron-nitride, selectively applied to the sheets to determine the shape of the structural article and the areas of diffusion bonding of the sheets.

The sandwich sheets are then seam welded around the periphery to form an assembly. The assembly is placed in a cavity formed by dies and a seal effected between the hollow stainless steel pin and the die in which it is located. The dies are brought together to apply a squeezing pressure to that portion of the assembly to be diffusion bonded. The assembly is heated to about 1650° F. and the sandwich is subjected to an inert gas, preferably argon, to prevent contamination of the sandwich surfaces. Thereafter, the assembly is heated for a prolonged period at about 1650° F. while inert gas under pressure is directed to the interior of the sandwich assembly to form a structural assembly.

This invention consists of the novel parts, constructions and improvements shown and described.

The accompanying drawing which is incorporated in and constitutes a part of this specification illustrates an embodiment of the invention and together with the description serves to explain the principles of the invention.

BRIEF DECRIPTION OF THE DRAWING

The drawing is a cross sectional view illustrating an embodiment of the invention.

DETAILED DESCRIPTION OF THE INVENTION

This invention is particularly useful in superplastic forming and diffusion bonding of a sandwich construction consisting of two or more layers of metal at least one of which is the type, e.g., titanium and certain titanium alloys which are capable of being superplastically formed. In particular, the invention is useful in forming honeycomb-like and stringer-stiffened structural shapes used in the aerospace industry.

As illustrated in the drawing, there are metal layers 2 and 4, capable of being diffusion bonded and superplastically formed into a desired structural shape.

The sheets 2 and 4 are selectively coated with stop-off such as boron nitride, yttria or other inert material to prevent diffusion bonding of the layers in the areas where stop-off has been applied. The sandwich layers are then joined adjacent their peripheries by spot or seam welding 6 to thereby form a layered or sandwich assembly. The layered assembly is then placed between a pair of die members 8, 10.

The die members are interiorly shaped in accordance with the desired final shape of the sandwich or stringer-stiffened construction. As illustrated, the lower face 12 of the upper die 8 is substantially flat, whereas the lower die 10 has a recessed surface 14. However, for some applications (i.e., bulkheads) both surfaces may be recessed.

As can be seen in the drawing, the layer can, during the operation, assume the shape shown in dot-dash lines. It is possible by superplasticity to form very complex shapes if so desired.

The upper layer 2 has a groove 18 in its lower surface which permits gas to pass easily into the interior of the sandwich assembly.

The upper die 8 has a passageway 20 which terminates at one end in a half dome-shaped recess 22 which accommodates the upper sandwich layer when the vacuum is applied through the passageway 20 which is connected to any suitable source of vacuum not shown.

In accordance with this invention, means is provided for directing gases through one of the sandwich layers to and from the interior of a metal sandwich construction in a sealed manner.

As embodied this means includes a stainless steel hollow pin 26 (preferably RA 330 stainless) having a reduced diameter portion 27 which fits into a hole 16 in the lower layer of the sandwich. The reduced diameter portion 27 forms a shoulder 29 adapted to transmit force from the upper die to the pin 26 when the upper and lower dies are brought together.

The other end of the hollow stainless steel pin is tapered so as to form a pointed, knife-like edge 28. The hollow pin 26 is positioned within a recess 24 in the lower die and may be circular in cross section. Positioned at the bottom of the recess 24 is a washer-like sealing element 30. Preferably, the sealing element is made of relatively soft material such as copper. In this way the knife-like edge 28 of the stainless steel pin can become embedded in the copper washer and form a sealing relationship therewith. The lower die 10 also includes a passageway 32 which communicates with the inside of the hollow stainless steel pin to thereby direct gases towards and away from the sandwich construction.

In operation, the reduced diameter portion 27 of the hollow stainless steel pin is press fitted into the hole in the lower layer of this sandwich. The sheets are cleaned and selectively treated with stop-off to control the areas of diffusion bonding depending on the desired final shape.

The peripheries of the top and bottom sheets are seam or spot welded to form a sandwich assembly.

The sandwich assembly is placed between the upper 8 and lower dies 10 and the upper die is forced downwardly to effect a seal between the hollow stainless steel pin and the copper washer.

The dies and the assembly are then heated to about 1650° F. and the gases between the layers are evacuated to prevent contamination of the sandwich surfaces. In addition, since the stainless steel pin has a higher coefficient of expansion than the sandwich material, e.g., titanium, the reduced diameter portion of the hollow stainless steel pin will expand more than the hole in the titanium sheet, thus insuring a tight sealed fit between the stainless steel pin and the lower sandwich sheet.

An inert gas such as argon is directed through the passageway 32, through the opening in the washer, through the hollow pin and to the interior of the metal sandwich. The gas will, in the embodiment shown in the drawing, expand the lower layer of the metal sandwich into the die cavity 14 by superplastic forming the layer 4. The argon gas is under pressure starting relatively low and building up to about 300 pounds per square inch.

As noted previously, the argon gas is passed through the hollow pin in and through one layer of the sandwich in a direction perpendicular to the sandwich layers rather than through an inlet tube which is between the sandwich layers and generally parallel to the sandwich layers. Thus, when the layers are seam welded adjacent their peripheries there is no danger of the hollow pin being broken, closed or otherwise affected by the seam welding operation.

What is claimed is:

1. A system for superplastic forming and diffusion bonding a metal workpiece sandwich having at least first and second layers between an upper die and a lower die to form a honeycomb structural shape comprising:

(a) a hollow pin;
   (b) means for positioning said pin within one of the dies perpendicular to the layers of the metallic sandwich and in communication with the interior of the metallic sandwich;

(c) means maintaining said hollow pin in sealing engagement with one of said layers and in sealing engagement with said one die;

(d) passageway means within said die for directing gases through said pin to and from the interior of the metal sandwich.

2. A system as defined in claim 1 wherein one end of said pin is positioned within a hole in said one layer of the metal sandwich.

3. A system as defined in claim 2 wherein said pin has a higher coefficient of expansion than said one layer.

4. A system as defined in claim 3 wherein one of said dies has a recess therein and said pin is positioned in said recess.

5. A system as defined in claim 4 wherein said one end of said pin has a reduced diameter.

6. A system as defined in claim 5 wherein the other end of said pin has a knife-like shape.

7. A system as defined in claim 6 having a washer made of relatively soft material positioned in said recess in engagement with said knife-like end.

8. A method for superplastically forming and diffusion bonding a metal workpiece sandwich having at least first and second layers between an upper die and a lower die comprising:

(a) placing an end portion of a hollow pin into a hole in one of the metal workpiece layers so that the hollow pin and said layer are in sealed relationship;

(b) selectively coating the metal layers with stop-off;

(c) placing the metal layers in face-to-face engagement;

(d) joining the first and second layers together at their edges to form a sandwich assembly;

(e) placing the sandwich assembly between an upper die and a lower die so that the hollow pin is in a recess in one of said dies and in sealed relationship with said die;

(f) subjecting the sandwich assembly to pressure and heat so as to cause diffusion bonding of selected areas of the first and second metal layers; and (g) passing inert gas under pressure through said hollow pin and to the interior of the sandwich assembly so as to cause superplastic forming of selected areas of said first and second layers to thereby form a honeycomb-like structural unit.

9. A device for forming a honeycomb-like structure from a metal sandwich having at least first and second metal layers by superplastic forming and diffusion bonding, comprising:

(a) an upper die and a lower die adapted to be brought together under pressure;

(b) a hollow stainless steel pin having one end in sealed relationship with one of the metal layers, and extending from the surface of said one metal layer;

(c) a recess in one of said dies;

(d) means maintaining said hollow pin in said recess in sealed relationship with said die; and (e) passageway means in said one die for directing gas under pressure through said hollow pin to the interior of the metal sandwich to cause superplastic deformation of at least one of said layers.

10. A device as defined in claim 9 wherein said hollow pin is made of stainless steel.

11. A device as defined in claim 9 wherein a washer-like member is positioned in the bottom of said recess and said hollow pin has a knife-like edge in sealing engagement with said washer.

12. A device as defined in claim 10 wherein one end of said hollow pin has a press fit with a hole in said one metal layer.

13. A device as defined in claim 12 wherein said hollow stainless steel pin extends perpendicularly from the surface of said one metal layer.

* * * * *